United States Patent [19]

James

[11] 4,187,731
[45] Feb. 12, 1980

[54] VARIABLE SPEED TRACTION TRANSMISSION

[76] Inventor: Robert G. James, 3509 Janene Way, Bakersfield, Calif. 93306

[21] Appl. No.: 824,345

[22] Filed: Aug. 15, 1977

[51] Int. Cl.² .................... F16H 15/26; F16H 15/08; F16H 55/34; F16H 15/00
[52] U.S. Cl. .................................. 74/198; 74/199; 74/201; 74/190; 74/214
[58] Field of Search ............... 74/198, 199, 200, 201, 74/190, 214, 216

[56] References Cited

U.S. PATENT DOCUMENTS

| | | | |
|---|---|---|---|
| 666,064 | 1/1901 | Nordberg | 74/199 |
| 1,806,984 | 5/1931 | Prout | 74/199 |
| 2,509,940 | 5/1950 | Rennerfett | 74/200 |
| 2,586,260 | 2/1952 | Rennerfett | 74/200 |
| 2,791,118 | 5/1957 | Hottz | 74/198 |
| 3,240,078 | 3/1966 | Newell | 74/200 |
| 3,530,732 | 9/1970 | Kashihara | 74/199 |
| 4,043,927 | 8/1977 | Duling et al. | 74/200 |

FOREIGN PATENT DOCUMENTS

| | | | |
|---|---|---|---|
| 273190 | 6/1951 | Italy | 74/200 |
| 257632 | 10/1948 | Switzerland | 74/200 |
| 120506 | 11/1918 | United Kingdom | 74/199 |
| 1265557 | 3/1972 | United Kingdom | 74/198 |

*Primary Examiner*—Samuel Scott
*Assistant Examiner*—Randall L. Green
*Attorney, Agent, or Firm*—William C. Babcock

[57] ABSTRACT

A variable speed gearless traction transmission particularly adapted for both power and manually operated vehicles, and when used on a power vehicle a continuous torque/speed take-off is provided that permits the engine to operate within a narrow range of speed and still provide a wide range of power and acceleration. The operation of the engine within such a narrow range not only reduces fuel consumption but also polluting emissions.

9 Claims, 15 Drawing Figures

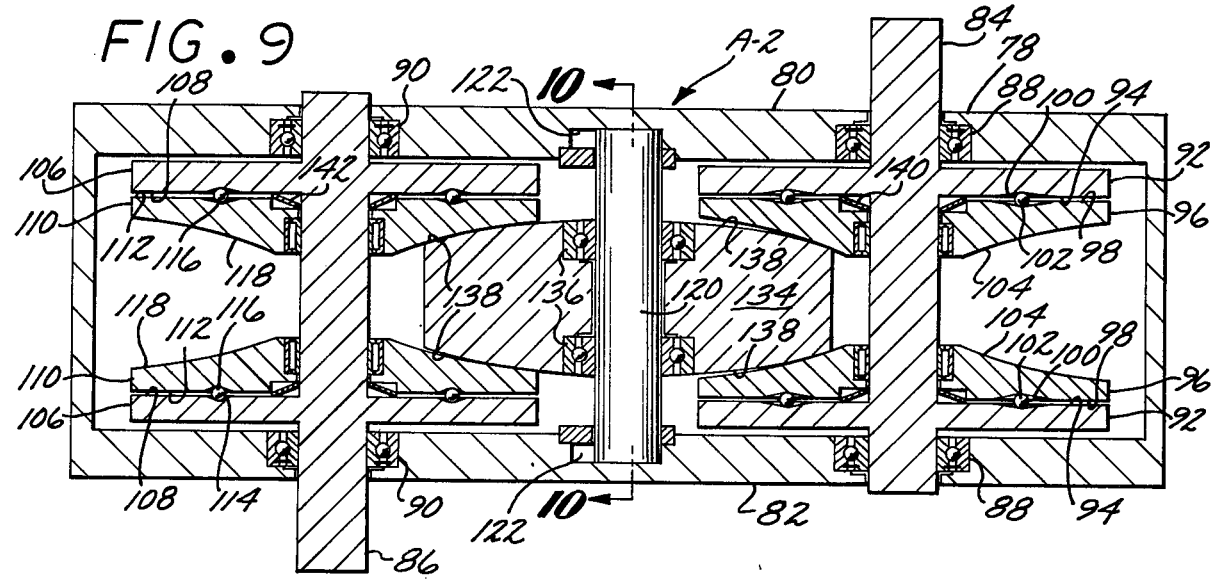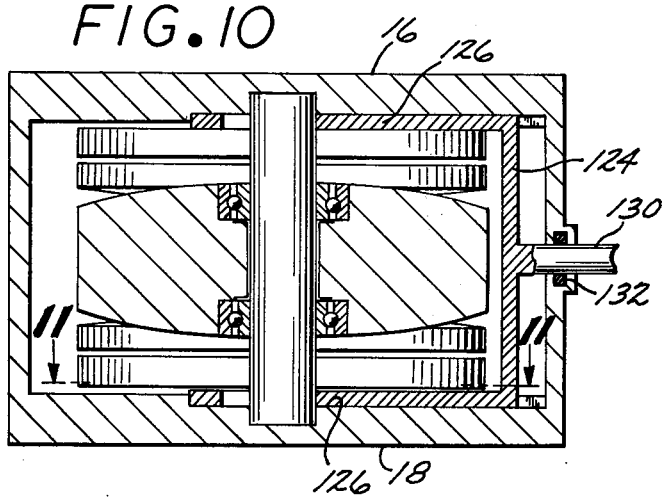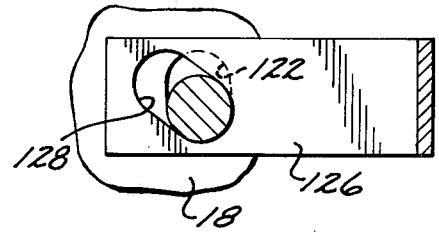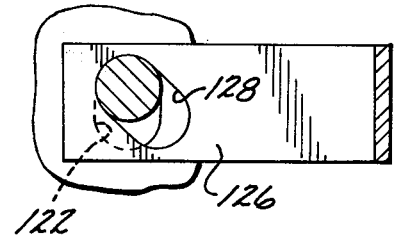

VARIABLE SPEED TRACTION TRANSMISSION

BACKGROUND OF THE INVENTION

1. Field of the Invention

Variable Speed Traction Transmission.

2. Description of the Prior Art

Conventional synchromesh transmissions operate by engaging sets of gears which transmit and control the torque and rotational speed of the engine to the drive wheels. To obtain smooth operation, the speed of the engine with conventional transmissions must be varied over a wide range at different gear ratios in a step-wise manner.

The primary purpose in devising the present invention is to provide a transmission that is free of gears and one that provides a continuous torque/speed take-off, with the engine operating within a narrow range of speed, and fuel consumption and polluting emissions being reduced as a result thereof. The present invention is also adapted for use on bicycles and motorcycles, and has the operational advantage that it requires a minimum of maintenance as it is completely free of gears and has a relatively simple structure.

SUMMARY OF THE INVENTION

The variable speed traction transmission of the present invention includes a housing that has a pair of side walls, with the housing preferably holding a quantity of a liquid lubricant that temporarily solidifies to a glass-like solid when subjected to substantial pressure.

A driving shaft and a driven shaft are journalled in the pair of side walls and extend therebetween in spaced parallel relationship. A first circular driving element and a first circular driven element are rigidly secured to the driving shaft and driven shaft and are situated within the housing. A second circular driving element and a second circular driven element are rotatably and slidably mounted on the driving and driven shaft within the housing and are adjacently disposed to the first driving and driven element. The second driving and driven elements on the portions thereof most remote from the first driving and driven elements define side surfaces that diametrically curve in a generally elliptical configuration. First and second spring means, such as Belleville springs, are mounted on the driving shaft and driven shaft and situated between the first and second driving elements and first and second driven elements to tend to maintain them at a fixed distance from one another. The first and second driving elements and first and second driven elements have elongate cam defining grooves formed therein in which hard rigid balls are disposed. The balls, so long as the first distances are maintained, permit the first driving element to rotate relative to the second driving element, and the second driven element to rotate relative to the first driven element. However, when the spacing between the first driving element and second driving element is reduced to less than the first distance, the second driving element rotates concurrently with the first driving element due to the balls moving in the cam defining grooves to binding engagement therewith. The first driven element and second driven element also rotate concurrently when the first distance therebetween is reduced. A third shaft is journalled in the side walls and is intermediately disposed between the driving and driven shaft. The third shaft may be moved toward and away from the driving shaft and driven shaft. A circular power transmitting element is rotatably supported on the third shaft, with the power transmitting element defining a ring-shaped surface that diametrically is of a generally elliptical shape.

Third means are provided for moving the third shaft and the power transmitting element relative to the driving and driven shaft, with the third means when disposing the third shaft and power transmitting elements in a first position allowing the driving shaft and first driving elements to rotate without driving the second driving element. However, when the third means disposes the third shaft and power transmitting element in any one of a number of second positions, the second driving element is moved toward the first driving element due to a first section of the ring-shaped surface forcibly and frictionally contacting the curved side surface of the second driving element to lessen the first distance to a second distance at which the first and second driving elements rotate concurrently together with a power transmitting element. When the power transmitting element is so rotating a second section of the ring-shaped surface thereof forcibly and frictionally contact the side surface of the second driven element to move the second driven element to a second distance relative to the first driven element, at which the first and second driven elements and the driven shaft rotate concurrently. The driven shaft will rotate at a different rate than the driving shaft when the first and second sections of the ring-shaped surface of the power transmitting element are at different radial distances from the third shaft.

BRIEF DESCRIPTION OF THE DRAWINGS

FIG. 9 is a longitudinal cross-sectional view of a second form of the transmission;

FIG. 10 is a transverse cross-sectional view of the transmission shown in FIG. 9 taken on the line 10—10 thereof;

FIG. 11 is a fragmentary cross-sectional view of the transmission taken on the line 11—11 of FIG. 10;

FIG. 12 is the same view as shown in FIG. 11 but with the yoke shifted to a second position;

FIG. 13 is a longitudinal cross-sectional view of a third form of the transmission;

DESCRIPTION OF THE PREFERRED EMBODIMENT

Figure 1:
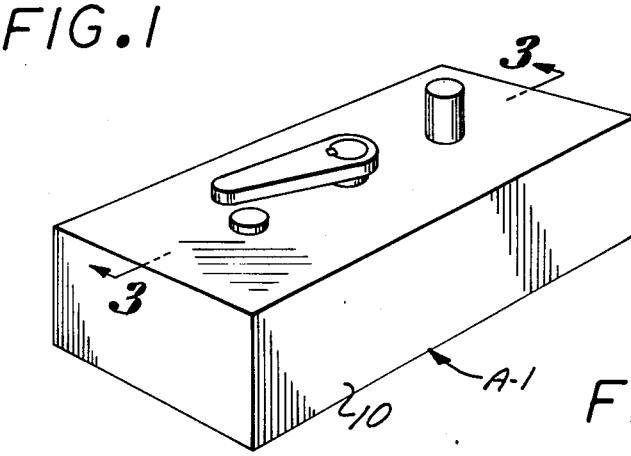
FIG. 1 is a perspective view of the variable speed traction transmission.
Figure 2:
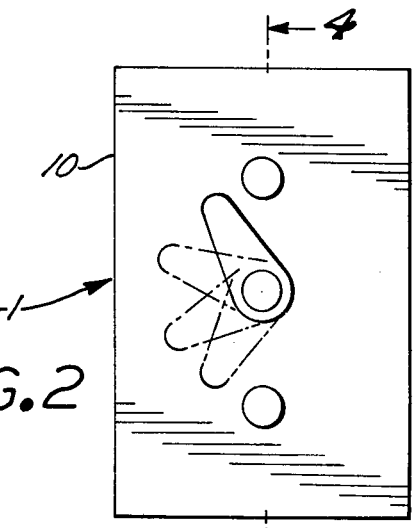
FIG. 2 is a top plan view of the transmission shown in FIG. 1.
Figure 3:
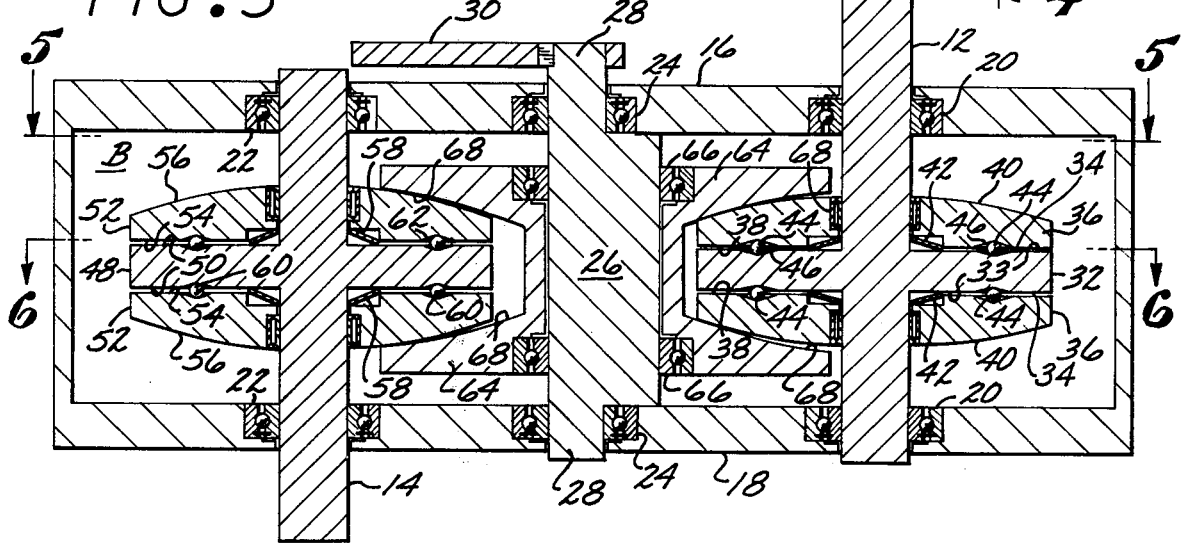
FIG. 3 is a longitudinal cross-sectional view of the transmission shown in FIG. 1 with the power transmitting element so arranged relative to the driving and driven shaft that the driven shaft rotates at a substantially slower rate of rotation than the driven shaft with FIG. 3 taken on the line 3—3 of FIG. 1.

The first form A-1 of the transmission as may best be seen in FIGS. 1-4 inclusive, includes a housing or case 10 which will be of conventional split structure, although the split structure is not illustrated in the drawings. The housing 10 rotatably supports a driving shaft 12 and driven shaft 14. The housing has a liquid lubricant B situated within the interior thereof, which lubricant is of a type that solidifies to a glass-like solid when subjected to substantial pressure. The lubricant may be the traction lubricant manufactured by the Monsanto Chemical Company under the trademark "SANTOTRAC", or a like material. The housing 10 includes a first side wall 16 and second side wall 18, which side walls have transversely aligned first, second and third pairs of bearing assemblies 20, 22 and 24 supported therefrom. A third shaft 26 is provided, of which shaft has eccentric extremities 28 rotatably supported in the third bearing assemblies 24. The third shaft may be pivoted in the third bearing assemblies 24 by an exteriorly positioned handle 30 as best seen in FIG. 3.

A first circular driving element 32 is formed as a part of the driving shaft 12 or rigidly secured thereto, with the driving element including flat oppositely disposed side surfaces 34. A pair of second driving elements 36 are provided that have flat side surfaces 38 adjacently disposed to the side surfaces 34.

Figure 6:
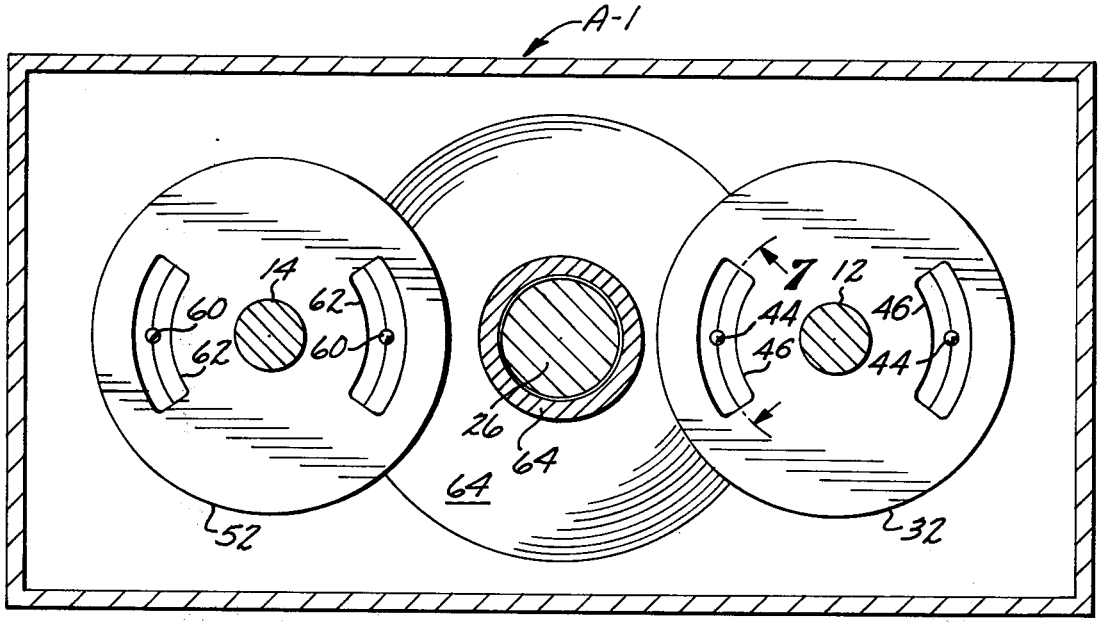
FIG. 6 is a longitudinal cross-sectional view of the transmission taken on the line 6—6 of FIG. 3.
Figure 7:
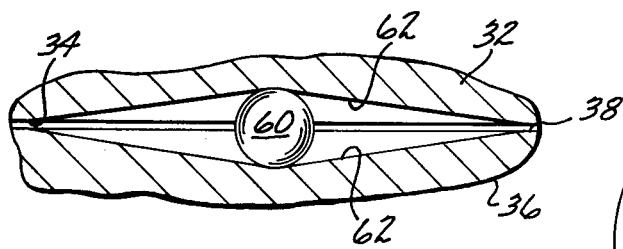
FIG. 7 is a fragmentary enlarged view of a portion of the driving assembly illustrating the cam lock ball that is disposed within two aligned cam defining grooves formed in the first and second driving elements.

Each of the second driving elements 36 has an exterior surface 40 that curves diametrically in the general configuration of a section of an ellipse. A pair of Belleville springs encircle the driving shaft 12 and are situated between the first driving element 32 and second driving element 36 to at all times tend to maintain the second driving element at first distances from the first driving element. A number of balls 60 are provided that are formed from a hard material such as steel or the like, with the balls being disposed in elongate circumferentially extending cam defining grooves 62 as may best be seen in FIGS. 6 and 7. The matched pairs of cam defining grooves 62 are formed in the flat surfaces 34 and 38. When the second driving elements 36 are at first distances from the first driving element 32, the balls allow the first driving element 32 to rotate without concurrently rotating the second pair of driving elements 36. However, when the second driving elements 36 are moved towards the first driving elements 32 to the extent that the distance therebetween is less than the first distance, the balls move longitudinally in the cam defining grooves 62 to cause concurrent rotation of the second driving elements 36 when the first driving elements 32 rotate.

Figure 4:
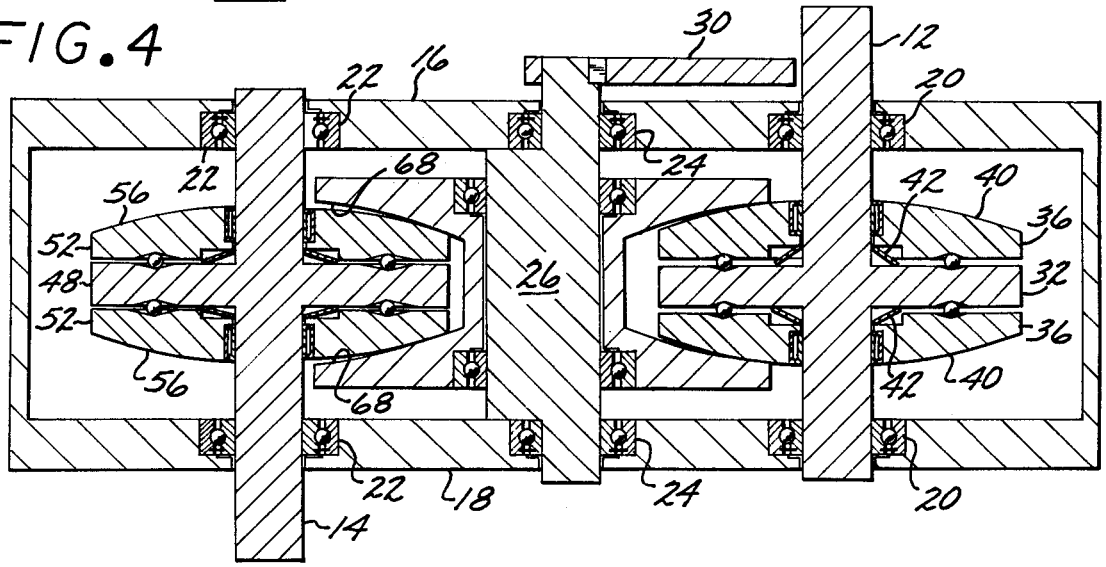
FIG. 4 is a second longitudinal cross-sectional view of the transmission taken on the line 4—4 of FIG. 2, with the power transmitting element so disposed that the driven shaft rotates at a substantially higher rate of rotation than the driving shaft.
Figure 5:
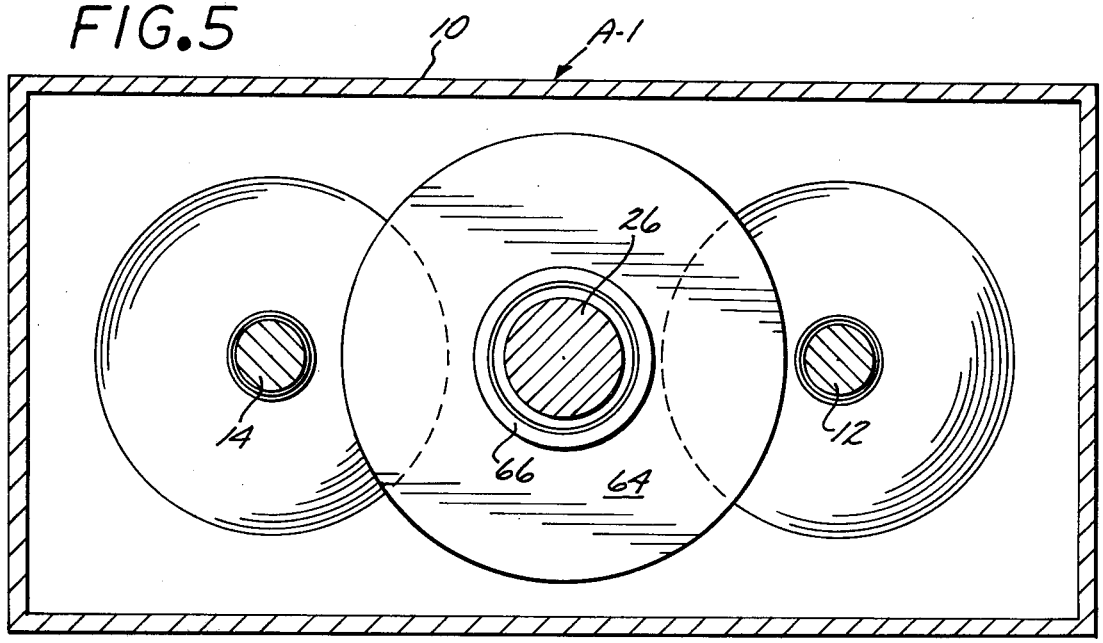
FIG. 5 is a longitudinal cross-sectional view of the transmission taken on the line 5—5 of FIG. 3.

A power transmitting element 64 in the general form of a spool is rotatably supported by pairs of bearings 66 on the third shaft 26 as best seen in FIG. 3. The spool defines two laterally spaced ring-shaped surfaces 68, which surfaces radially are in the configuration of a segment of an ellipse, as may be seen in FIGS. 3 and 4. The configuration of the curved surface 68 is such that as the power transmitting element 64 is shifted towards and away from the driving shaft 12, and driven shaft 14, a section of the curved surface 68 contacts the curved exterior surfaces 40 on the second driving element 36 and curved surfaces 56 on the second driven element 52. In FIG. 3 it will be seen that inwardly disposed sections of the curved surface 68 are in contact with outwardly disposed portions of the curved surfaces 40, and inwardly disposed sections of the curved surface 68 are in contact with outwardly disposed portions of the curved surfaces 56 on the second driven elements 52. The handle 30 may be used to rotate the third shaft 26 to a first position where the curved surfaces 68 are applying no substantial pressure to the curved exterior surface 40 and 56, and the second pair of driving elements 36 are separated from the first driving element 32 by the first distances previously mentioned. In such a situation the rotation of the driving shaft 12 will not transmit rotational power to the power transmitting element 64, and the first driving element 32 may rotate without rotating the second driving element 36. However, when the handle 30 is moved to rotate the third shaft 26 from the first position to any one of a number of second positions, the curved surfaces 68 of the power transmitting element 64 have sections thereof brought into pressure contact with the curved surfaces 40 of the second driving element 36 and the curved surfaces 56 of the second driven element 52. As the previously described movement takes place, the Belleville springs 42 and 58 are compressed to lessen the distances between the second driving element 36 and first element 32 as well as between the pairs of second driven elements 56 and first driven element 48 to distances less than the first distance. The balls 44 now move longitudinally in the cam defining grooves 46 as well as the balls 60 moving in the cam defining grooves 62 to cause concurrent rotation of the second pair of driving elements 36 with the first driving element 32, and this motion being transferred through the power transmitting element 64 to the second pair of driven elements 52 and from these elements to the first driven element 48 which results in rotation of the driven shaft 14. Thus, by rotation of the handle 30 the third shaft 26 rotates eccentrically to shift the power transmitting element 64 towards and away from the driving shaft 12 and driven shaft 14 for sections of the curved surfaces 68 to contact sections of the curved surfaces 40 and 56, and the driving shaft 12 rotating the driven shaft 14 at different speed ratios depending on the distances of the contacting sections from the driving shaft and driven shaft. Traction between the curved surfaces 40 of the second driving elements 36 and the curved surface 68, as well as between the curved surfaces 56 and surface 68 is highly effective, for at these contacting sections pressure is exerted between the power transmitting element and the second driving element 36 and driven element 52. This pressure results in the lubricant B disposed between the sections temporarily assuming a glass-like solid, and as a result there being a minimum of slippage between the second pair of driving elements 36 and the power transmitting element 64 as well as between the power transmitting element 64 and the pair of second driven elements 52. In FIG. 4 it will be seen that the handle 30 has been rotated sufficiently that the eccentrically supported third shaft 26 has moved towards the driving shaft 12, to dispose an inwardly disposed section of the curved surface 68 in pressure contact with outwardly disposed sections of the curved surfaces 40 of the second pair of driving elements 36, and an inwardly disposed section of the curved surface 68 in contact with outwardly disposed portions of the curved surfaces 56 of the second pair of driven elements 52.

Figure 8:
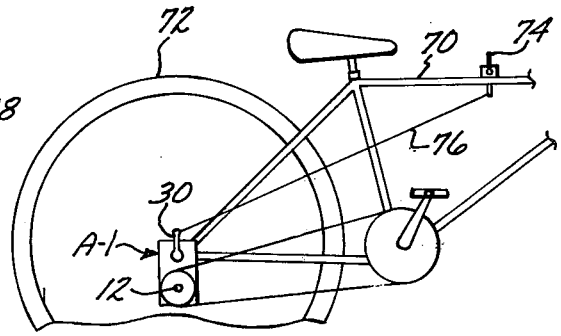
FIG. 8 is a side elevational view of the rear portion of a bicycle illustrating the manner in which the transmission may be used to drive the rear wheel of the vehicle at various rates of speed.

In FIG. 8 a bicycle 70 is shown that has the transmission A-1 mounted on the rearward portion thereof to drive the shaft (not shown) that supports the rear wheel 72. A lever 74 is pivotally supported from a convenient position on the bicycle 70 to permit the handle 30 to be moved by use of an elongate member 76 that extends between the two levers, or in lieu thereof a suitable cable arrangement may be used which conforms generally to the frame of the bicycle.

A second form A-2 of the transmission is shown in FIGS. 9-12 inclusive and includes a housing 78 having side walls 80 and 82. A driving shaft 84 and driven shaft 86 are rotatably supported in spaced parallel relationship by pairs of bearings 88 and 90 that are mounted in the side walls 80 and 82. A pair of spaced circular driving elements 92 are rotatably supported on the driving shaft 84, with each of the driving elements having a flat surface 94. A pair of second driving elements 96 are also mounted on the driving shaft 84 and have flat side surfaces 98 adjacently disposed to the flat side surfaces 94. The adjacently disposed flat side surfaces 94 and 98 have aligned cam defining elongate grooves 100 formed therein in which rigid balls 102 are disposed. Each of the driving elements 96 has an inwardly disposed curved ring shaped surface 104, with the radial curvature of the surface being substantially that of a section of an ellipse.

A pair of spaced first driven elements 106 extend outwardly from the driven shaft 86 as may best be seen in FIG. 9, with each of the first driven elements having a flat side surface 108. A pair of second driven elements 110 are mounted on the driven shaft 86 and also include flat side surfaces 112 adjacently disposed to the flat surfaces 108. The flat side surfaces 108 and 112 have aligned elongate cam defining grooves 114 therein in which rigid balls 116 are situated. The second driven elements have ring-shaped surfaces 118 that are adjacently disposed, with the surfaces curving radially in the configuration of a section of an ellipse.

A third shaft 120 is intermediately disposed between the driving shaft 84 and driven shaft 86 and has the ends thereof journalled in a first pair of elongate slots 122 that extend longitudinally in the side walls 80 and 82. A yoke 124 is transversely positioned within the housing 78, which yoke includes a pair of spaced legs 126 in which angularly disposed pairs of slots 128 are formed that slidably engage end portions of the third shaft 120. The yoke 124 may be moved transversely within the housing 78 by a rod 130 that extends through a sealed opening 132 formed in the housing. A power transmitting element 134 of circular configuration is rotatably supported by bearings 136 on the third shaft 120. The power transmitting element has oppositely disposed curved side surfaces 138, and the curvature of the side surfaces diametrically being in the configuration of a section of an ellipse. First and second pairs of Belleville springs 140 and 142 serve to maintain the first pair of driving elements 92 and second pair of driving elements 96 at first distances relative to one another, as also occurs between the first driven elements 106 and second driven elements 110.

By shifting the yoke 124 the third shaft may be moved towards or away from the driving shaft 84 and driven shaft 86 with the power transmitting element then having the curved surfaces 138 brought into contact with sections of the curved surfaces 104 and 118 and the Belleville springs 140 and 142 being compressed to allow the second driven element to move towards the first pair of driven elements 92 for the balls 102 to bind them together for rotational movement as the balls move in the slots 100. The same action occurs relative to the second driven elements 110 moving towards the first pair of driven elements 106 for the balls 116 to move in the grooves 114 to hold them in binding engagement. Rotational movement is imparted from the second pair of driving elements 96 to the power transmitting element 134 which, in turn, transfers rotational movement to the second pair of driven elements 110, first driven elements 106 and driven shaft 86. The driven shaft 86 rotates at a desired ratio relative to the driving shaft 84 depending on the distance of the contacting section of the power transmitting element 134 from the third shaft 120, as well as the distance of contacted sections of the second pair of driving elements 96 and driven elements 110 from the driving shaft 84 and driven shaft 86.

A third from A-3 of the transmission is shown in FIG. 13 that operates in the same manner as the first form A-1 except that in the third form but a single second driving element and second single driven elements are employed. The third form A-3 operates in the same manner as the first form A-1, and elements of the third form A-3 common to the first form A-1 are identified by the same numerals, but with A's being added thereto.

Figure 14:
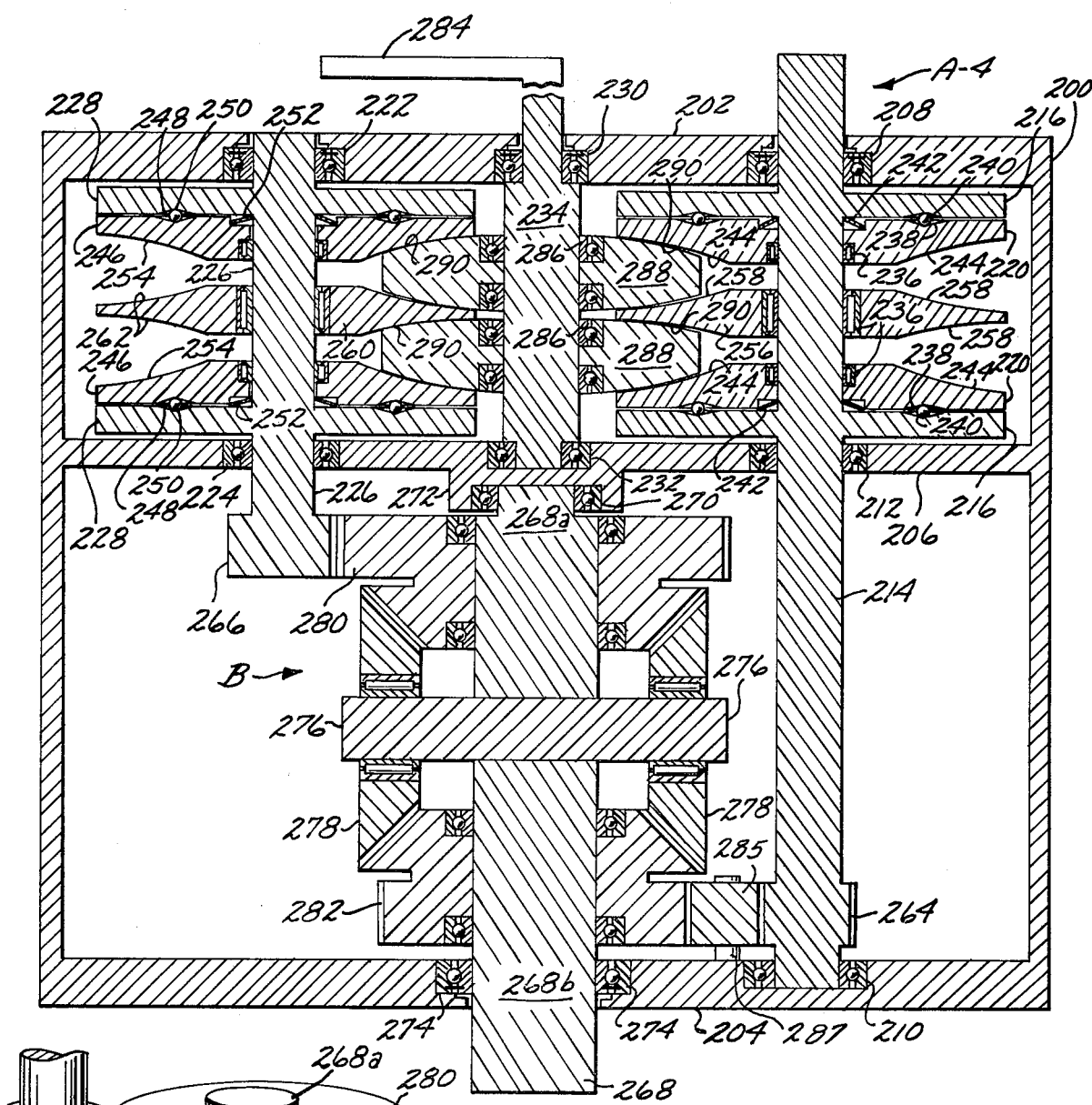
FIG. 14 is a cross-sectional view of a fourth form of the transmission which includes a differential assembly that drives a power output shaft at a rate of rotation that is dependent upon the rates of rotation of the driving and driven shaft.
Figure 15:
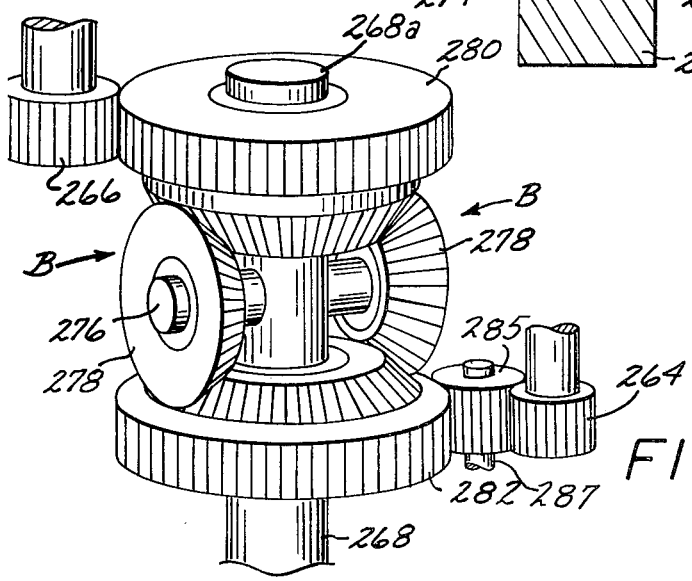
FIG. 15 is a perspective view of the differential assembly illustrated in FIG. 14.

A fourth form A-4 of the transmission is shown in FIG. 14. The fourth form A-4 of the transmission includes a housing 200 having first and second side walls 202 and 204 and an intermediate wall 206 situated therebetween. First and second bearings 208 and 210 are mounted in the first and second side walls 202 and 204 and together with a third bearing 212 supported in the intermediate wall 206 rotatably support a driving shaft 214. The driving shaft 214 has a pair of longitudinally spaced first circular driving elements 216 that extend outwardly therefrom and are in non-rotatable relationship relative the shaft 214. A second circular pair of driving elements 220 are intermediately positioned between the first pair of driving elements 216 as may best be seen in FIG. 14, with the second pair of driving elements 220 being rotatably supported on the driving shaft 214 by bearings 236.

Fourth and fifth axially aligned bearings 222 and 224 are mounted in the first side wall 202 and the intermediate wall 206 and serve to rotatably support a driven shaft 226. A first pair of longitudinally spaced circular driven elements 228 are rigidly secured to the driven shaft 226 as shown in FIG. 14.

Seventh and eighth aligned bearings 230 and 232 are supported in the first side wall 202 and intermediate wall 206 and rotatably support an intermediate shaft 234. A number of circumferentially extending cam defining grooves 238 are formed in the adjacent surfaces of the first circular driving elements 216 and second circular driving elements 220, with these grooves having balls 240 mounted therein. Each of the pairs of first driving elements 216 and second driving elements 220 have a Belleville spring 242 disposed therebetween, and the spring maintaining the first and second driving elements at first distances relative to one another. The second circular driving element 220 on the portions thereof adjacent one another define ring-shaped surfaces 224 which radially are in a configuration that define a section of an ellipse.

A second pair of circular driven elements are rotatably supported on the driven shaft 246 as may be seen in FIG. 14, with the second driven elements and the surfaces of the first driven elements 228 most adjacent thereto having aligned cam defining grooves 248 formed therein in which balls 250 are disposed. Each of the pairs of first driven elements 228 and second elements 246 are maintained at first distances relative to one another by the Belleville springs 252 shown in FIG. 14. The second pair of driven elements on the portions most adjacent thereto define ring-shaped surfaces 254 that radially are curved in the shape of a section of an ellipse. A first circular spacing element 256 is rotatably supported on the driving shaft 256 by a bearing 236, with the first spacing element 256 defining a pair of oppositely disposed ring-shaped surfaces 258 thereon, with each of the surfaces curving radially in the configuration of a section of an ellipse. A second circular spacing element 260 is rotatably supported on the driven shaft 226. The second circular spacing element 260 is of the same shape and configuration as the first circular spacing element 256. The second circular spacing element 260 defines two oppositely disposed ring-shaped surfaces 262 that radially have a curvature in the configuration of a section of an ellipse. A first sprocket 264 is secured to the driving shaft 214 adjacent the second side wall 204 as shown in FIG. 14, with the driven shaft 226 having a second sprocket 266 secured to the inwardly disposed ends thereof. A differential assembly B is provided, which in detail includes the following elements.

A power output shaft 268 is provided that is a part of the differential assembly B, which shaft has a first end portion 268a of power output shaft 268 which is rotatably supported in a fixed bearing 270 that is held in a fixed position within a cylindrical boss 272 that depends downwardly from the third wall 206 as best seen in FIG. 14. A second end portion 268b of the power output shaft 268 is rotatably supported in a seventh bearing 274 that is supported in the second side wall 204. The power output shaft 268 intermediate the wall 206 and second side wall 204 has a transverse shaft 276 mounted thereon, which shaft supports a pair of spaced gears 278. The gears 278 are in concurrent toothed engagement with a second gear 280 that also engages the sprocket 266. The pair of gears 278 engage a third gear 282 as best seen in FIG. 14, which third gear is in toothed engagement with an idling gear 285 that is in engagement with the sprocket 264. Idling gear 285 is mounted on a shaft 287 secured to wall 204. The intermediate shaft 234 is eccentrically mounted in the bearings 230 and 232 and the shaft 234 being pivotal therein by a handle 284 or other suitable means. The intermediate shaft 234 may be eccentrically pivoted in the bearings 234 by the use of the handle 284. The intermediate shaft 234 has pairs of bearings 286 rotatably supported thereon, with each pair of bearings rotatably supporting a power transmitting element 288 of circular configuration. Each of the power transmitting elements include two oppositely disposed curved exterior surfaces 290, with the curvature in a radial direction being generally less than a segment of an ellipse. When the handle 284 is in the first position, the intermediate shaft 234 is so disposed that motion is not transmitted by the pair of power transmitting elements 288 from the second pair of driving elements 220 to the second pair of driven elements 246. However, as the handle moves from the first to any one of a number of second positions, the shaft 234 is pivoted to move relative to the driving shaft 214 and driven shaft 226 to cause the second driven element 246 to rotate concurrently with the second pair of driving elements 220 due to movement of the balls 248 and 250 in the grooves 238 and 248. When the driving shaft 214 rotates at a faster rate of rotation that the driven shaft 226, the differential B will cause the power output shaft 268 to rotate in one direction, with this direction being reversed when the driven shaft 226 rotates faster than the driving shaft 214. Thus, due to the relative rates of rotation of the driving shaft 214 and driven shaft 226 the direction of rotation of the power output shaft 268 may be controlled. Also, the relative speed of rotation of the driving shaft 214 and the driven shaft 226 in combination with the differential B determines the rate of rotation of the power output shaft 268. The use and operation of the various forms of the invention have been previously explained in detail and need not be repeated. In all of the various forms of the invention above described, it is preferable to use a lubricant within the housing that has the property of solidifying to a glass-like mat when subjected to substantial pressure, to increase the traction between the driving and the driven elements.

What is claimed is:

1. A variable speed traction transmission that includes:

a. a housing that includes a pair of side walls;

b. a driving shaft and a driven shaft journalled in said pair of side walls and extending therebetween in spaced parallel relationship;

c. first circular driving means and first circular driven means rigidly secured to said driving shaft and driven shaft and disposed in said housing;

d. second circular driving means and second circular driven means rotatably and slidably mounted on said driving and driven shaft within said housing and adjacently disposed to said first driving and driven means, said second driving and driven means on the portions thereof most remote from said first driving and driven means being convolved to form first elliptical surfaces of revolution;

e. first and second spring means for maintaining said second driving and driven means at a first distance relative to said first driving and driven means where said first driving and driven means may rotate without rotating said second driving and driven means;

f. first and second means operatively associated with said first and second driving means and said first and second driven means for concurrently rotating said first and second driving means and said first and second driven means when said first distance is lessened to a second distance and said driving shaft is rotated;

g. a third shaft journalled in said side walls and extending therebetween, said third shaft intermediately disposed between said first and second shafts, said third shaft laterally movable relative to said driving and driven shafts;

h. a circular power transmitting element rotatably supported on said third shaft, said element defining a ring-shape having a peripheral groove convolved on the inwardly opposing faces thereof to form second elliptical surfaces of revolution; and i. third means for moving said third shaft and power transmitting element laterally relative to said driving and driven shafts, said third means when disposing said third shaft and power transmitting element in a first position allowing said driving shaft and first driving means to rotate without driving said second driving means, but said third means when disposing said third shaft and power transmitting element in any one of a plurality of second positions moving said second driving means towards said first driving means due to a first section of said ring-shaped surface forcibly and frictionally contacting said first elliptic surface of said second driving means to lessen said first distance to said second distance and said first and second driving means rotating said power transmitting element, and a second section of said ring-shaped surface forcefully and frictionally contacting said first elliptic surface of said second driven element to move said second driven element to said second distance relative to said first driven element, with said driven shaft rotating at a different rate than said driving shaft when said first and second sections are at different radial distances from said third shaft.

2. A variable speed traction transmission as defined in claim 1 which in addition includes:

j. a quantity of a liquid lubricant in said housing of the type that temporarily transforms to a glass-like solid when subjected to pressure, with said liquid lubricant providing substantial traction between said first and second elliptic surfaces of revolution when the portion of said liquid lubricant therebetween is temporarily transformed to said glass-like solid.

3. A variable speed traction transmission as defined in claim 2 in which said first driving means and first driven means are first and second circular plates that each have a pair of flat oppositely disposed side surfaces.

4. A variable speed traction transmission as defined in claim 3 in which said second driving and driven means are circular rigid bodies that include flat surfaces adjacently disposed to one of the flat surfaces of said first and second circular plates.

5. A variable speed traction transmission as defined in claim 4 in which said first and second spring means are first and second Belleville springs disposed between said first plate and first body and said second plate and said second body.

6. A variable speed traction transmission as defined in claim 5 in which said first and second means are a plurality of rigid first and second balls disposed in a plurality of elongate tapered cavities defined in said adjacently disposed flat surfaces of said first and second plates and said first and second bodies.

7. A variable speed traction transmission as defined in claim 6 in which said third shaft is eccentrically journalled in said side walls of said housing and said third means is a crank connected to said third shaft and exteriorly disposed relative to said housing.

8. A variable speed traction transmission as defined in claim 6 in which said third shaft is journalled in aligned elongate longitudinal slots in said side walls of said housing and said third means is a yoke transversely movable in said housing, said yoke including a pair of angularly disposed elongate slots that slidably engage end portions of said third shaft, with said yoke when moved transversely shifting said third shaft longitudinally to dispose said third shaft and power transmitting element to said first position or any desired one of said second positions.

9. A variable speed traction transmission as defined in claim 2 that in addition includes:

j. first and second gears on said driving and driven shaft;

k. a power output shaft;

l. a transverse shaft supported by said power output shaft;

m. a pair of pinions rotatably supported on opposite ends of said transverse shaft; and n. third and fourth gears rotatably supported on said power output shaft, said third and fourth gears in engagement with said first and second gears, and the speed of rotation and the direction of rotation of said power output shaft being determined by the speed of rotation of said driving shaft and driven shaft.

* * * * *